United States Patent [19]

Jones

[11] 4,052,365

[45] * Oct. 4, 1977

[54] MANUFACTURE OF CRYSTALLIZABLE POLYMERIC PHENYLENE ETHER SULPHONE KETONES

[75] Inventor: Michael Edward Benet Jones, Runcorn, England

[73] Assignee: Imperial Chemical Industries Limited, London, England

[ * ] Notice: The portion of the term of this patent subsequent to July 22, 1992, has been disclaimed.

[21] Appl. No.: 482,603

[22] Filed: June 24, 1974

Related U.S. Application Data

[63] Continuation of Ser. No. 635,664, May 3, 1967, abandoned, which is a continuation-in-part of Ser. No. 320,508, Oct. 31, 1963, abandoned.

[30] Foreign Application Priority Data

Nov. 6, 1962 United Kingdom .............. 41976/62
Mar. 18, 1963 United Kingdom .............. 10592/63
Oct. 3, 1963 United Kingdom .............. 38973/63

[51] Int. Cl.$^2$ ...................... C08G 67/00; C08G 75/23
[52] U.S. Cl. ........................................ 260/49; 260/823
[58] Field of Search ................................ 260/49, 823

*Primary Examiner*—Lester L. Lee
*Attorney, Agent, or Firm*—Cushman, Darby & Cushman

[57] ABSTRACT

Random or block copolymers having repeating units of the structures

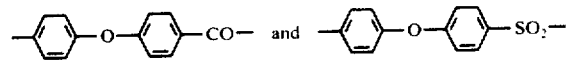

are crystallizable, in contrast to the regular alternating copolymer

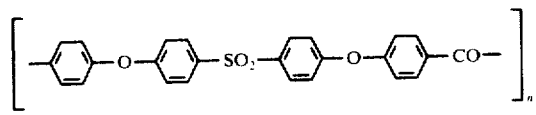

which is amorphous, and they are useful as thermoplastic, film- and fiber-forming materials. They may be made by copolymerizing 4-phenoxyphenylsulphonyl and 4-phenoxybenzoyl chlorides in the presence of ferric chloride, or by copolymerizing alkali metal salts of 4-(4-chlorophenylsulphonyl) phenol and 4-(4-chlorobenzoyl) phenol.

3 Claims, No Drawings

MANUFACTURE OF CRYSTALLIZABLE POLYMERIC PHENYLENE ETHER SULPHONE KETONES

This is a continuation of application Ser. No 635,664 filed May 3, 1967, which in turn is a continuation-in-part of Ser. No. 320,508, filed Oct. 31, 1963, both now abandoned.

The present invention relates to new crystallisable polymeric aromatic materials containing phenylene, ether, sulphone, and ketone groups in the polymer chain.

The new polymeric materials of the invention are formed of repeating units having the structure —Ar—SO$_2$— and repeating units of the structure —Ar—CO— where Ar is a divalent aromatic residue derived from a compound having the structure

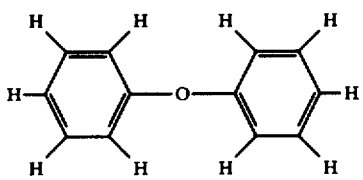

These polymers, containing repeating units of the structure —Ar—CO—, tend to be crystalline in character. The physical properties of these polymers are closely dependent on their crystallisation characteristics, e.g. degree of crystallinity, crystal form, rate of crystallisation and melting point. The all-para polyketone homopolymer having repeating units of the formula I

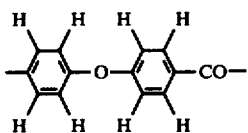 (I)

is a highly crystalline material of high melting point, and the presence of repeating units of the formula II

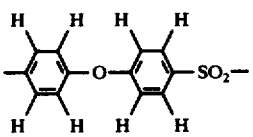 (II)

in the copolymers correspondingly reduces the tendency of the products to crystallise and also reduces their melting points.

The present invention provides a means of controlling the crystallinity of aromatic polymers the chains of which comprise paraphenylene groups, oxygen atoms and sulphonyl and carbonyl groups by replacing some of the carbonyl groups by sulphonyl groups; thus it is possible by replacing a predetermined proportion of such groups to adjust the crystallisation characteristics of the various products to give the physical properties most suitable for particular purposes.

Table 1 shows the structures of examples of some copolymers according to the invention, in comparison with the homopolymers.

TABLE 1

| Ratio of I to II | Copolymers of units I and II Structure 'as made' |
|---|---|
| 0/100 | Amorphous |
| 20/80 | Amorphous |
| 35/65 | Amorphous |
| 50/50 | Crystalline m.p. 295° C |
| 65/35 | Crystalline |
| 75/25 | Crystalline |
| 80/20 | Crystalline |
| 100/0 | Crystalline m.p. 338° C |

Crystallinity was detected by X-ray diffraction. Melting points were determined using a Perkin-Elmer differential scanning calorimeter ona 5 mg sample with a heating rate of 16° C/min. and are corrected by calibration.

The crystal forms exhibited by these copolymers are very similar to that of poly(4,4'-diphenylene ether ketone)

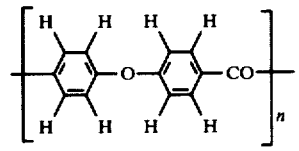

and the regular alternating copolymer

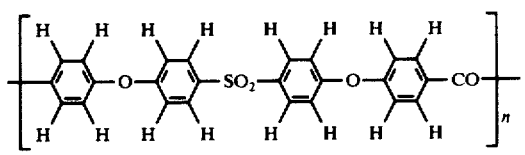

is almost certainly amorphous, reported as having a Tg of 205° C. Hence the crystallisable copolymers of the present invention are thought to contain poly(4,4'-diphenylene ether ketone) blocks. More random copolymers can also be obtained, and unlike the regular alternating copolymer these are also crystalline; they generally have lower melting points than the block copolymers of the same composition. Both the random copolymers and the block copolymers differ from the regular alternating copolymer in having repeating units of the structure —Ar—SO$_2$— and repeating units of the structure —Ar—CO—, and the latter are believed to be responsible for the crystallisability; obviously there are no such adjacent —Ar—CO— units in the regular alternating copolymer.

Two types of copolymer are of major interest:

a. Crystalline (random or block) copolymers with m.p. 250°-330° C for application as thermoplastic, fibre-forming or film-forming materials.

b. Copolymers which are amorphous 'as made' but which crystallise on annealing or on nucleation, e.g. with poly-(4,4'-diphenylene ether ketone). Such polymers may be cast into films or spun into fibres from the solutions in which they are prepared or may be isolated as amorphous polymers and processed as such in the manner customary, e.g. for polyethylene terephthalate films and fibres. Among the copolymers that may exhibit this behaviour are random copolymers or block copolymers within the approximate composition ranges II/I = 35/65 to 50/50. The initially amorphous polymers are particularly suitable for fabrication at their softening point without degradation to give shaped products which are generally strong and inert to a wide variety of chemicals, both acid and alkaline, even at temperatures near their softening point. They may be melt spun to yield fibres and filaments which may be used in applications where resistance to chemical and high temperatures is desired, for example in the manufacture of protective clothing, and they may be extruded to give strong, transparent films which can withstand flexing and are suitable for wrapping or in electrical applications where their high softening points are particularly advantageous. They may be shaped by any suitable process to give hard, strong, mouldings having good stability to thermal degradation at temperatures as high as 300° C. The shaped products may be used, for example, as electrical insulants, for instance in transformer parts, switch gear and condensers.

Many of the products are soluble in polar organic solvents such as dimethyl formamide and in concentrated sulphuric acid. Fibres and films may be formed from the organic solutions and coatings deposited from the solutions, e.g. on wire, give good electrical insulation. The coated products may be used in conditions where elevated temperatures are encountered, for instance in electrical transformers and high voltage switch gear.

The reduced viscosity of the polymer is desirably at least 0.3 (measured at 25° C at 1% in a solvent such as dimethyl formamide) if it is to serve for structural purposes.

The polymers may be mixed with other suitable ingredients such as dyes, pigments, heat and light stabilisers, plasticisers, mould-release agents, lubricants and fillers and may be blended with other polymeric materials if desired.

The polymers may be made by heating together an aromatic monosulphonyl chloride of the structure H—Ar—SO$_2$Cl, an aromatic monocarbonyl chloride of the structure H—Ar—COCl and a catalyst, alone or in the presence of an inert solvent. Suitable solvents are highly polar compounds such as cyclic tetramethylene sulphone and nitrobenzene.

The catalysts used in the polymerisation are iron salts which are soluble in the polymerisable mixture or antimony pentachloride; the salts may be those of ferrous or ferric iron. Examples of iron salts that may be used are ferric fluoride, ferric chloride, ferrous bromide, ferrous iodide, ferric orthophosphate and ferrous and ferric acetoacetonates. In general, it is preferred to use the iron halides because of their useful catalytic activity and ferric chloride is particularly preferred because of its ready solubility in a wide variety of solvents, the ease with which it may be obtained in very pure form and because its use under suitable conditions consistently gives polymers of high molecular weight.

The catalysts are used in amounts of from 0.05% to 5% by weight of the polymerisable ingredients. Generally, amounts of less than 0.05% induce only very slow polymerisation but it is preferred to use not more than 1% by weight of catalyst because of the difficulty in removing the catalyst residues from the polymer. Amounts of from 0.1 to 0.5% are preferred.

The polymerisable components are heated until molten and thoroughly mixed before the catalyst is added to the melt. As polymerisation continues the temperature is raised in order to maintain the ingredients in the molten state and when the maximum required temperature is reached, this is maintained for a further period of time, generally of the order of 2 to 3 hours in order to allow completion of the polymerisation. During the polymerisation, hydrogen chloride is evolved and must be removed, e.g. by effecting the reaction under vacuum. The reaction is preferably conducted in the presence of an inert gas such as nitrogen in order to ensure the absence of oxygen above the melt. Where it is desired to obtain polymer of high molecular weight within a reasonable time period, temperatures of 200° C or more are generally required.

However, there is an undesirable tendency for the polymers to cross-link if they are subjected above certain temperatures, generally about 250° C, during polymerisation. Therefore, an improved process for obtaining polymers of high molecular weight is one in which the polymerisable material is subjected in the presence of the catalyst to a temperature above its melting point but below that at which substantial cross-linking of the polymeric product would occur until the mixture becomes viscid or solid; the mixture is cooled and comminuted, and the comminuted product is thereafter reheated to a temperature below that at which substantial cross-linking would occur in order to complete the polymerisation.

Since some of the reagents in the polymerisation process may react with water it is preferred, where products of high molecular weight are required, to rigorously exclude moisture from the reaction vessel during the polymerisation and, in the improved process, during the comminution step.

The course of the polymerisation may be followed by measuring the evolution of hydrogen chloride.

After the polymerisation, it is preferred to remove the catalyst residues from the product since their presence may cause discolouration and sometimes degradation. Any suitable process may be used. For example, the polymer may be ground down to powder and treated with hydrochloric acid in an alcohol, preferably methanol, under reflux. However, this process is frequently inadequate and removes only small amounts of the catalyst. Therefore it is preferred to dissolve the polymer in a suitable solvent such as dimethyl formamide or nitrobenzene and treat it in solution with a complexing agent, preferably a chelating agent, for the catalyst. The complex is then separated from the polymer. The treated polymer may be re-precipitated by pouring the filtered solution into a suitable non-solvent for the polymer such as an alcohol, preferably methanol, or acetone, and is then thoroughly dried, preferably at elevated temperature and preferably under vacuum.

The products often tend to suffer from "setting-up" during processing operations which necessitate holding the polymers at elevated temperatures and particularly in molten form. It is believed that this "setting-up", which may be recognised by an increase in the viscosity of the melt, is due to decomposition of terminal sulphonyl or carbonyl chloride groups to yield active points in the polymer chain. These active points precipitate a cross-linking reaction which may ultimately reduce the polymer to an insoluble, infusible mass which is useless for normal fabrication processes in plastic art. The process of "setting-up" may be substantially reduced or eliminated entirely by reacting the polymers in solution and below the temperature at which "setting-up" would occur with an organic compound having one or two groups per molecule which will react with the sulphonyl chloride or carbonyl chloride groups in the polymer to yield products which are stable at temperatures at which the polymer is molten. Suitable compounds are aromatic amines, particularly aniline, and the process may suitable be effected before, after or during the process for removing the catalysts from the polymer. In such cases, any excess of the compound may be removed from the polymer at the same time as the catalyst complexes.

The aromatic polymers of this invention, the chains of which comprise para-phenylene groups, oxygen atoms and sulphonyl and carbonyl groups, may also be made by the method described and claimed in the specification of copending United States application Ser. No. 580,290 filed Sept. 19, 1966 by D. A. Barr and J. B. Rose.

According to that specification polymers may be produced by a method in which an alkali metal salt of a 4-(4-halogenobenzoyl) phenol or an alkali metal salt of a 4-(4-halogenophenylsulphonyl) phenol is polymerised by the displacement of alkali metal halide at an elevated temperature, preferably above 200° C and preferably in the presence of a diluent substantially unreactive under the conditions employed.

It has not been found that products having especially desirable physical properties may be made by a method as described and claimed in that specification in which an alkali metal salt of a 4-(4-halogenobenzoyl) phenol is copolymerized with an alkali metal salt of a b 4-(4-halogenophenylsulphonyl) phenol by the displacement of alkali metal halide.

The halogen atoms in the polymerisable compounds are preferably chlorine or fluorine. The fluorine derivatives generally are more reactive and enable the displacement of alkali metal halide to be carried out more quickly, but are more expensive. Bromine derivatives are also relatively expensive and although they resemble the chlorine derivatives in performance they would seem to offer no advantages. Iodine derivatives are generally less suitable.

The alkali metal cation is conveniently potassium or sodium. Displacement of alkali metal halide often occurs more readily if the potassium cation is present in the reagent used, but the weight (and usually the price) per mole of a potassium compound is higher than for the corresponding sodium compound. Some or all of the alkali metal cation in the reagent may be replaced by an organic onium cation having a positively charged hetero-atom (for example a quaternary ammonium cation such as tetramethyl-ammonium) stable under the conditions of the reaction, and the term "alkali metal" salt as used herein is deemed to refer also to salts containing such onium cations.

The polymerisations are preferably carried out in dimethyl sulphone solution at 200-250° C in the absence of water and oxygen. Polymerisations in 1,1-dioxothiolan solution at 240° C tend to yield polymers of low molecular weight. Polymerisations in the absence of solvent at 320°-340° C tend to form insoluble material.

The vessel used should be made of or lined with a material that is inert to alkali metal phenoxides and also to alkali metal halides under the conditions employed. For example, glass is unsuitable as it tends to react with the phenoxides at high temperatures, upsetting the stoichiometry of the polymerisation and contaminating the product with silicate. Some grades of stainless steel undergo surface crazing at these temperatures in the presence of alkali metal halide, and vessels made of or lined with titanium or nickel or an alloy thereof or some similarly inert material would be preferable.

The alkali metal halide resulting from the polymerisation reaction can be removed from the polymer by any suitable means. For example, it can be extracted from the high polymer using water, or the polymer itself can be dissolved in a strongly polar organic solvent (for example dimethyl formamide, 1-methyl-2-oxo-pyrrolidine, dimethyl sulphoxide, 1,1-dioxothiolan or nitrobenzene) and then reprecipitated by addition to a liquid such as water which is miscible with the polymer solvent but itself a non-solvent for the polymer.

When the polymer is formed in solution, a convenient procedure is to add the reaction mixture (which may be decanted or filtered from solid alkali metal halide) to an excess of a liquid which is miscible with the reaction solvent but in which the polymer is insoluble. If the reaction solvent is water-miscible, or is miscible with a liquid in which residual alkali metal halide also dissolves, the polymer can thus be obtained in one step. Otherwise, as for example if the reaction mixture is poured into methanol, the precipitated polymer initially contains alkali metal halide which can subsequently be washed out with water.

Random copolymers may be readily obtained by slowly feeding the alkali metal salt of the 4-(4-halogenophenylsulphonyl) phenol into a reaction mixture which initially contains only the alkali metal salt of the 4-(4-halogenobenzoyl) phenol.

The invention is illustrated by the following examples in which all parts are expressed as parts by weight. Reduced viscosities were measured at 1% in dimethylformamide at 25° C.

EXAMPLE 1

15.1 Parts of 4-phenoxybenzoyl chloride (boiling point 146° C at 0.4 mm. Hg.) and 27.1 parts of diphenyl ether-4-sulphonyl chloride (melting point 44° C) were heated to 130° C under a slow current of dry nitrogen. 1.4 Parts of freshly sublimed ferric chloride were dissolved in the melt and the temperature was raised to 220° C over a period of 75 minutes when it was found that 79% of the theoretical amount of hydrogen chloride had been evolved. The mixture was cooled to yield a brittle foam which was powdered and reheated to 230° C to 240° C for 40 minutes under high vacuum. The mixture was then cooled again, ground to a powder, washed with cold dimethyl formamide followed by methanol and dried at 80° C for 2 hours under vacuum to yield 29 parts of a crystalline polymer.

Infra-red analysis (by comparison with standard mixtures of homopolymers derived from each of the polymerisable monomers) showed the product to contain 35% by weight of units having the structure I

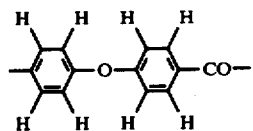
(I)

Analysis of the sulphur content of the polymer show it to contain 36% by weight of these units.

EXAMPLE 2

41.7 Parts of 4-phenoxybenzoyl chloride and 5.3 parts of diphenyl ether-4-sulphonyl chloride were melted together at 170° C and 2.5 parts of freshly sublimed ferric chloride were dissolved in the melt. After 2 3/4 hours at 170° C, 86% of the theoretical amount of hydrogen chloride had been evolved and the mixture was cooled, powdered and reheated to 240° C for 90 minutes under high vacuum (0.1 mm. Hg. absolute pressure). The product was cooled, ground to a powder, washed with hot acetone and dried overnight at 90° C under vacuum to yield 36 parts of a polymer partially soluble in nitrobenzene and soluble in 4,4'-diphenoxy diphenylsulphone at 200° C.

Infra-red analysis by the method described in Example 1 showed the polymer to contain 90% by weight of units having the structure I.

The polymer was highly crystalline, the crystal form being that of the homopolymer derived from 4-phenoxybenzoyl chloride.

EXAMPLE 3

A series of polymerisations were effected following the process of Example 2 but using varying concentrations of monomers and catalyst. The concentrations of each monomer and the catalyst and the form of the products obtained are set out below.

| Experiment | Monomers | | Catalyst | Weight % of units I in polymer | Form of polymer |
| --- | --- | --- | --- | --- | --- |
| | 4-phenoxy-benzoyl chloride | diphenyl ether-4-sulphonyl chloride | | | |
| A | 37.0 | 10.7 | 2.2 | 78 | Crystalline |
| B | 32.4 | 16.1 | 2.4 | 67 | Crystalline |
| C | 23.2 | 26.7 | 1.8 | 46 | Crystalline |

EXAMPLE 4

The potassium salts of 4-(4-chlorophenylsulphonyl) phenol(1.00 g) and 4-(4-chlorobenzoyl) phenol (1.00 g) and dimethyl sulphone (2.00 g) were heated together under dry nitrogen for 18 hours at 220° C. The viscous reaction product was allowed to cool and was then diluted with dimethyl formamide. The resulting solution was filtered and then dripped into stirred aqueous methanol (50:50 v/v) and the polymer which precipitated was collected, washed with boiling methanol and then dried in vacuo. The resulting polymer (1.0 g) contained 7.8% sulphur, corresponding to the structure II/I = 52/48, and had reduced viscosity = 0.22. The polymer was crystalline (m.p. 295° C) and was stable in air up to 500° C.

EXAMPLE 5

Example 4 was repeated using 7.5 g of dimethyl sulphone. 0.8 g of polymer was obtained with reduced viscosity = 0.30.

EXAMPLE 6

The potassium salts of 4-(4-chlorophenylsulphonyl) phenol (1.00 g) and 4-(4-chlorobenzoyl) phenol (1.00 g) and 1,1-dioxothiolan (10.0 cm³) were heated together under dry nitrogen for 4.5 hours at 240°-250° C. The reaction mixture was allowed to cool and was then filtered and dripped into stirred water. The precipitated polymer was collected, washed with boiling methanol and then dried in vacuo to yield 1.8 g of a crystalline polymer having reduced viscosity = 0.10.

EXAMPLE 7

The potassium salts of 4-(4-chlorophenylsulphonyl) phenol (1.00 g) and 4-(4-chlorobenzoyl) phenol (1.00 g) were heated together at 320°-340° C under dry nitrogen for 1 hour. The reaction products were heated with dichloroacetic acid (40 cm³) at 140° C for 30 minutes and the resulting solution was filtered.

The filtrate was dripped into stirred water and the polymer which precipitated was collected, washed with boiling methanol and dried to yield 0.4 g of an amorphous polymer containing 8.0% sulphur, corresponding to the structure II/I = 53/47.

The residue was washed with water and dried to yield 1.6 g of an amorphous solid.

What I claim is:

1. A crystallizable copolymer containing phenylene, ether, sulphone and ketone groups in the polymer chain, which is formed of repeating units having the structure —Ar—SO₂— and repeating units of the structure —Ar—CO—, where Ar is a divalent aromatic residue derived from a compound having the structure:

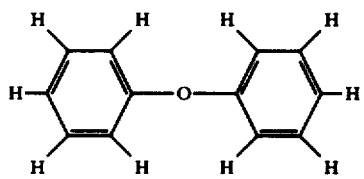

by removing the hydrogen atoms which are para to the oxygen atoms.

2. A crystallisable polymeric material according to claim 1 formed of repeating units having the structure I

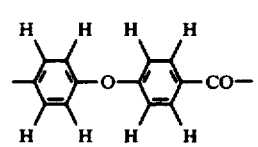

(I)

and repeating units having the structure II

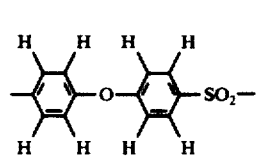

(II)

3. A crystallisable copolymer according to claim 2 within the approximate composition range II/I = 35/65 to 50/50.

* * * * *